US007001023B2

(12) United States Patent
Lee et al.

(10) Patent No.: US 7,001,023 B2
(45) Date of Patent: Feb. 21, 2006

(54) METHOD AND SYSTEM FOR CALIBRATING PROJECTORS TO ARBITRARILY SHAPED SURFACES WITH DISCRETE OPTICAL SENSORS MOUNTED AT THE SURFACES

(75) Inventors: Johnny Chung Lee, Pittsburgh, PA (US); Daniel Maynes-Aminzade, St. Paul, MN (US); Paul H. Dietz, Hopkinton, MA (US); Ramesh Raskar, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 89 days.

(21) Appl. No.: 10/635,404

(22) Filed: Aug. 6, 2003

(65) Prior Publication Data

US 2005/0030486 A1 Feb. 10, 2005

(51) Int. Cl.
*G03B 21/00* (2006.01)
*G03B 21/14* (2006.01)
*G03B 21/26* (2006.01)
*H04N 3/22* (2006.01)
*H04N 3/23* (2006.01)

(52) U.S. Cl. .......................... 353/69; 353/30; 353/121; 348/745; 348/746

(58) Field of Classification Search .................. 353/30, 353/69, 70, 121, 122; 348/744, 745, 746, 348/747, 806, 807, 189, 190, 191, 658
See application file for complete search history.

(56) References Cited

U.S. PATENT DOCUMENTS 4,684,996 A 8/1987 Baumeister ................. 358/231
5,455,647 A 10/1995 Fujiwara ..................... 353/101
5,465,121 A 11/1995 Blalock et al. ............. 348/744
5,548,357 A 8/1996 Appel et al. .................. 353/69
5,664,858 A 9/1997 Woo ............................ 353/69
5,707,128 A 1/1998 Dugdale ....................... 353/50
5,752,758 A 5/1998 Woo ............................ 353/69
5,795,046 A 8/1998 Woo ............................ 353/69
6,305,805 B1 10/2001 Liebenow .................... 353/69
6,310,662 B1 10/2001 Sunakawa et al. .......... 348/747
6,367,933 B1 4/2002 Chen et al. ................... 353/69

(Continued)

FOREIGN PATENT DOCUMENTS

EP 1134973 9/2001

(Continued)

OTHER PUBLICATIONS

"Merriam-Webster's Collegiate Dictionary, Tenth Edition", copyright 2001, p. 327.*

(Continued)

*Primary Examiner*—Melissa Jan Koval
(74) *Attorney, Agent, or Firm*—Dirk Brinkman; Andrew J. Curtin

(57) ABSTRACT

A system determines correspondence between locations on a display surface and pixels in an output image of a projector. The display surface can have an arbitrary shape and pose. Locations of known coordinates are identified on the display surface. Each location is optically coupled to a photo sensor by an optical fiber installed in a throughhole in the surface. Known calibration patterns are projected, while sensing directly an intensity of light at each location for each calibration pattern. The intensities are used to determine correspondences between the locations and pixels in an output image of the projector so that projected images can be warped to conform to the display surface.

24 Claims, 5 Drawing Sheets

U.S. PATENT DOCUMENTS

| | | | | |
|---|---|---|---|---|
| 6,416,186 | B1 | 7/2002 | Nakamura | 353/69 |
| 6,456,339 | B1 * | 9/2002 | Surati et al. | 348/745 |
| 6,499,847 | B1 | 12/2002 | Yoneno | 353/70 |
| 6,527,395 | B1 | 3/2003 | Raskar et al. | 353/70 |
| 6,554,431 | B1 | 4/2003 | Binsted et al. | 353/28 |
| 6,768,509 | B1 * | 7/2004 | Bradski et al. | 348/207.99 |
| 6,832,825 | B1 * | 12/2004 | Nishikori et al. | 347/19 |

FOREIGN PATENT DOCUMENTS

| | | |
|---|---|---|
| EP | 1322123 | 6/2003 |

OTHER PUBLICATIONS

Patent abstracts of JP. 7 162790, Mitsubishi Electric Corp., Jun. 23, 1995.

* cited by examiner

METHOD AND SYSTEM FOR CALIBRATING PROJECTORS TO ARBITRARILY SHAPED SURFACES WITH DISCRETE OPTICAL SENSORS MOUNTED AT THE SURFACES

FIELD OF THE INVENTION

This invention relates generally to calibrating projectors, and more particularly to calibrating projectors to display surfaces having arbitrary shapes.

BACKGROUND OF THE INVENTION

Portable digital projectors are now common. These projectors can display large format images and videos. Typically, the projector is positioned on a table, located in a projection booth, or mounted on the ceiling.

In the prior art, the optical axis of the projectors must be orthogonal to a planar display surface to produce an undistorted image. In addition, a lateral axis of the projector must be horizontal to obtain a level image. Even if the above constraints are satisfied, it is still difficult, or even impossible, given physical constraints of the projection environment, to perfectly align a projected image with a predefined target image area on the projection surface. If the projector is placed causally, then image correction is required.

A complete correction for a planar display surface needs to consider three degrees of positional freedom, two degrees of scalar freedom, and three degrees of rotational freedom to minimize distortion. These corrections may be insufficient if the display surface is an arbitrary manifold. Hereinafter, the term manifold refers specifically to a topological connected surface having an arbitrary shape and pose in three dimensions. Pose means orientation and position.

It is possible to distort the image to be projected so that the projected image appears correctly aligned and undistorted. However, this requires that the projector be carefully calibrated to the display surface. This calibration process can be time-consuming and tedious when done manually and must be performed frequently to maintain a quality image. For a dynamic display environment, where either the projector or the display surface or both are moving while projecting, this is extremely difficult.

Most prior art automatic calibration techniques are severely limited in the number of degrees of freedom that can be corrected, typically only one or two degrees of keystone correction. They are also limited to planar display surfaces. Prior art techniques that have been capable of automatically correcting for position, size, rotation, keystone distortion as well as irregular surfaces have relied on knowledge of the absolute or relative geometry data of the room, the display surface, and calibration cameras. When a camera is used for calibration, the display surface must be reflective to reflect the calibration pattern to the camera. A number of techniques require modifications to the projector to install tilt sensors.

The disadvantages of such techniques include the inability to use the projector when or where geometric calibration data are not available, or when non-projector related changes are made, such as a repositioning or reshaping the display surface or changing the calibration cameras. When the display surface is non-reflective, or when the display surface is highly reflective, which leads to confusing specular highlights, camera based calibrations systems fail. Also, with camera based systems it is difficult to correlate pixels in the camera image to corresponding pixels in the projected image.

Therefore, there is a need for a fully automated method for calibrating a projector to an arbitrarily shaped surface.

SUMMARY OF THE INVENTION

The present invention provides a method and system for calibrating a projector to a display surface having an arbitrary shape. The calibration corrects for projector position and rotation, image size, and keystone distortion, as well as non-planar surface geometry.

The present invention provides a method and system for finding correspondences between locations on a display surface, perhaps, of arbitrary shape, and projector image pixels. For example, the system can be used to classify parts of an object that are illuminated by a left part of the projector versus a right part of the projector.

The system according to the invention uses discrete optical sensors mounted in or near the display surface. The method measures light projected directly at the surface. This is distinguished from camera-based systems that measure light reflected from the surface indirectly, which leads to additional complications. In addition each sensor corresponds to a single pixel in the projected image. In camera-based systems it is difficult to determine the correspondences between camera pixels and projector pixels for a number of reasons, including at least different optical properties, different geometries, different resolutions, and different intrinsic and extrinsic parameters.

Individual discrete sensors measure the intensity of the projected image at each location directly. Using one or more projected patterns, the system estimates which pixel in the projector's image is illuminating which sensed location.

When the 2D or 3D shape and geometry of the display surface is known, and the location of the optical sensor within this geometry is known, the information about which projector pixels illuminate which sensor can be used to calibrate the projector with respect to the display surfaces.

Calibration parameters obtained are used to distort an input image to be projected, so that a projected output image appears undistorted on the display surface. The calibration parameters can also be used for other purposes such as finding a pose of the projector with respect to the display surface, determining internal and external geometric parameters, finding the distance between the projector and the display surface, finding angles of incident projector rays on the display surface with known geometry, classifying surface regions into illuminated and not illuminated segments by the projector, computing radial distortion of the projector, finding relationship between overlapping images on the display surface from multiple projectors, and finding deformations of the display surface.

DETAILED DESCRIPTION OF THE PREFERRED EMBODIMENT

System Structure

Figure 1:
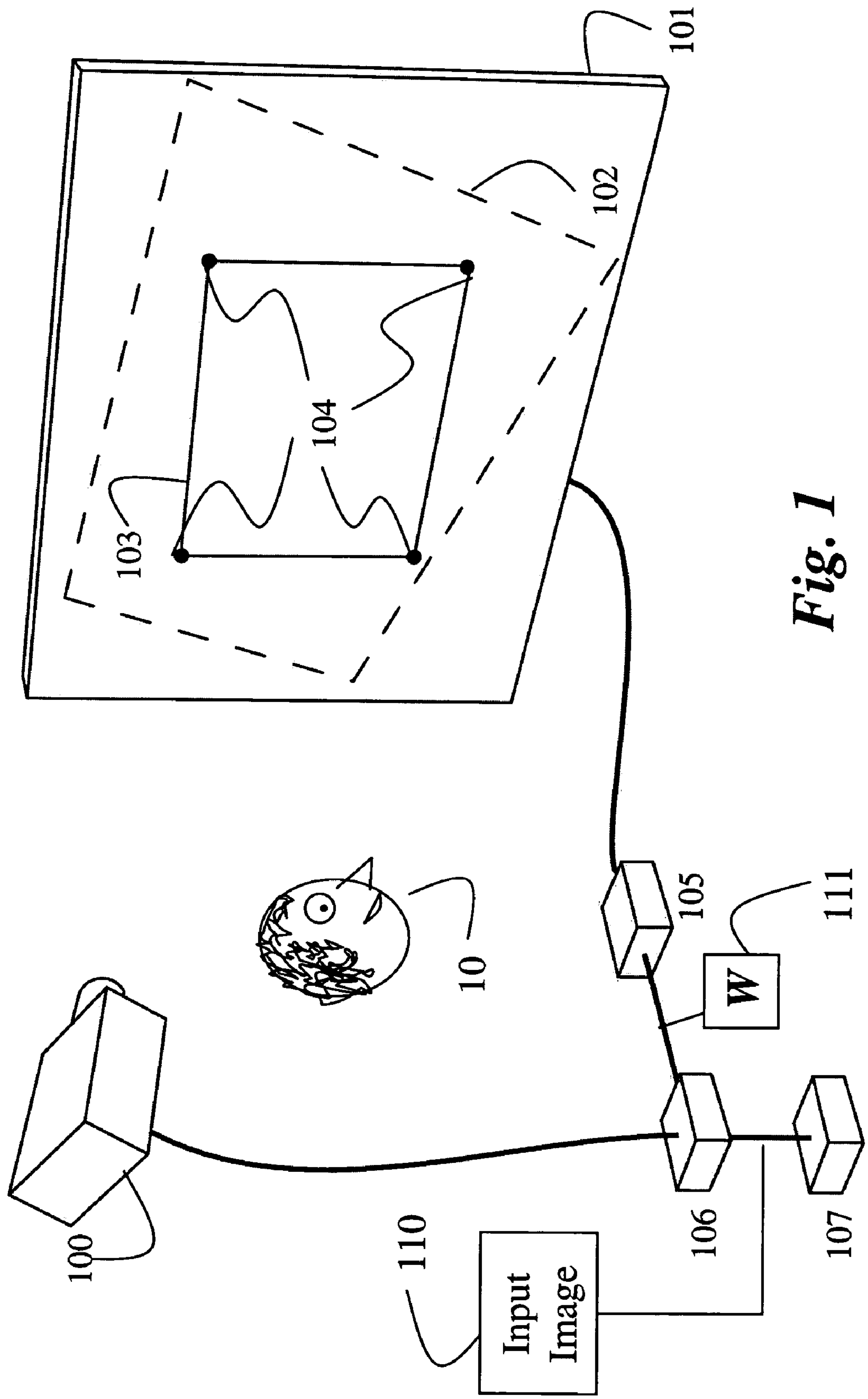
FIG. 1 is a schematic of a system for calibrating a projector to a planar display surface containing optical sensors according to the invention.

As shown in FIG. 1, a projector 100 is casually aligned with a planar display surface 101. Here, the viewer 10 and the projector 100 are on the same side of the display surface 101. Therefore, the projected images are reflected by the display surface to the viewer. Because of the casual alignment, an output image or video 102 of the projector may not coincide perfectly with a desired image area 103 of the display surface. Therefore, it is necessary to distort an input image 110 so that it conforms to the image area 103 when projected as the output image.

Therefore, the display surface 101 includes four locations 104 with known coordinates, either in 2D or 3D. It should be noted that additional locations could be used depending on a size and topology of the surface 101. Four is a minimum number of locations required to fit the output image to the rectangular image area 103 for an arbitrary projection angle and a planar display surface.

Optical sensors measure an intensity of optical energy at the known locations 104 directly. This is in contrast with a camera based system that measures projected images indirectly after the images are reflected by the display surface. The direct measuring has a number of advantages. That is, unlike camera-based projector calibration, the present system does not have to deal with intensity measurements based on reflected light, which has a more complex geometry.

Figure 5:
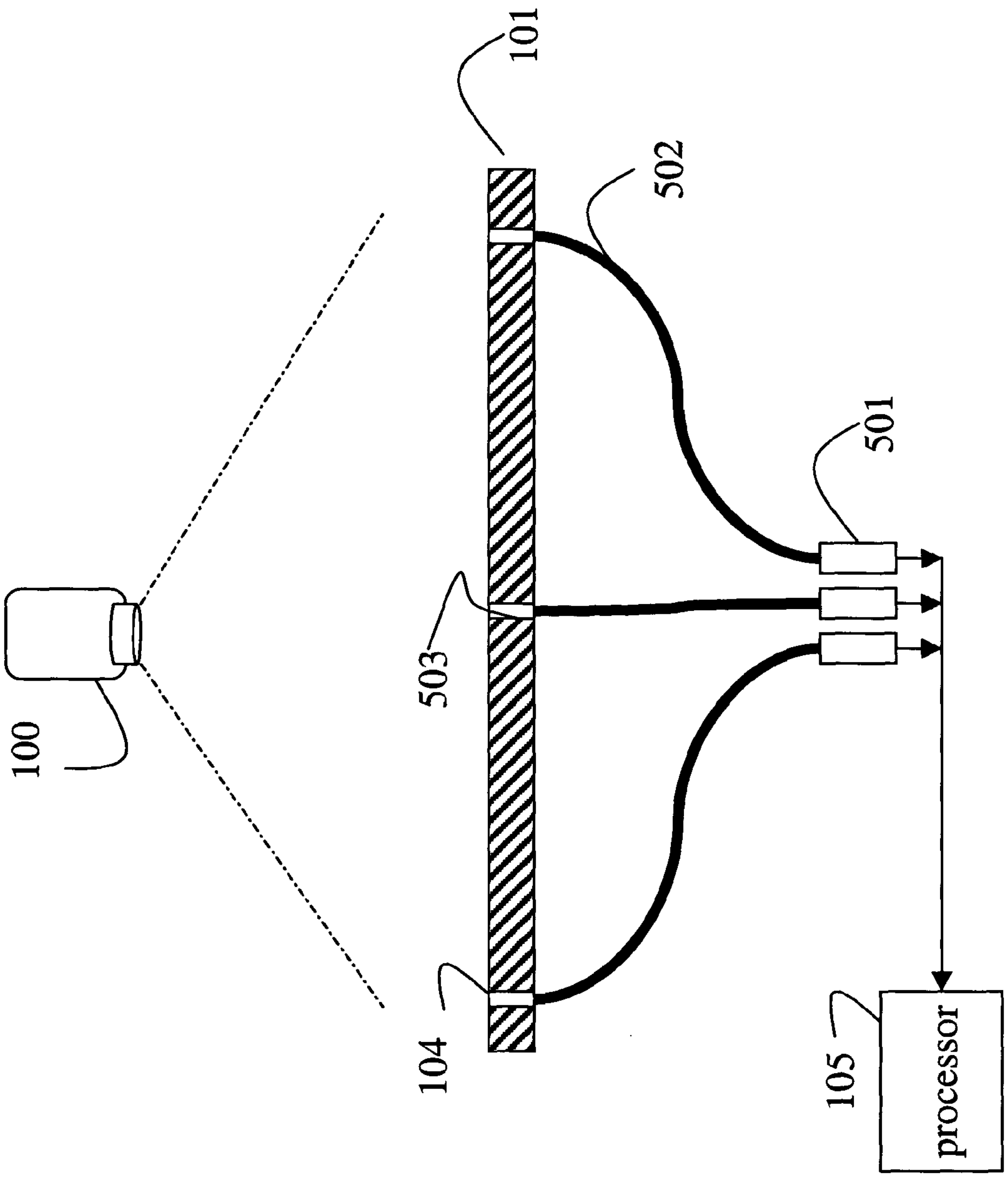
FIG. 5 is a side view of a display surface with discrete optical sensors.

In one embodiment, the sensors are photodiodes or phototransistors mounted in or near the surface at the locations 104. Alternatively, as shown in FIG. 5, photo sensors 501 are coupled to the surface locations 104 by optical fibers 502. The surface includes throughholes 503 to provide an optical paths or a route for the fibers 502. The throughholes can be a millimeter in diameter, or less. It is well known how to make very thin optical fibers. This facilitates reducing a size of the sensed location to a size of projector pixels, or less. For the purpose of the invention, each sensed location corresponds substantially to a projected pixel in the output image. This embodiment is also useful for instrumenting small sized 3D models that are to be augmented by the projector 100.

The locations 104 can be independent of the image area 103 as long as the geometric relationship between the image area and the locations is known. This is straightforward when the surface is planar or parametrically defined, e.g., the surface is quadric or other higher order surfaces, including surfaces that cannot be described parametrically.

A calibration module (processor) 105 acquires sensor data from each of sensor 501. In a preferred embodiment, the sensor data, after A/D conversion, are quantized to zero and one bits. Zero indicating no sensed light, and one indicating sensed light. The light intensity can be thresholded to make this possible. As an advantage, binary intensity readings are less sensitive to ambient background illumination. Although, it should be understood, that the intensity could be measured on a gray scale. Links between the various components described herein can be wired or wireless. The calibration module can be in the form of a PC or laptop computer.

Figure 4:
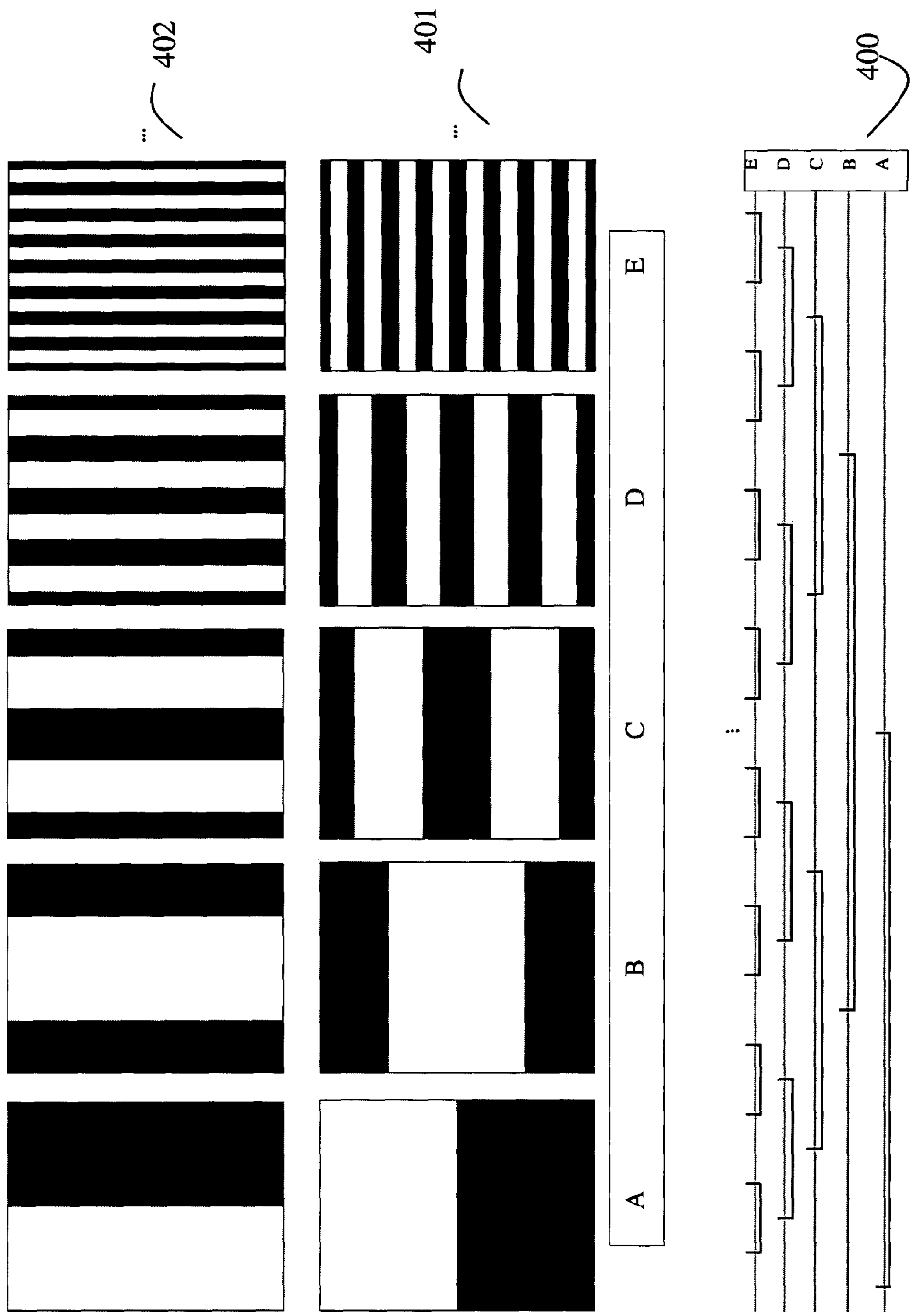
FIG. 4 shows Gray code calibration patterns used by the invention.

As shown in FIG. 4, the calibration module 105 can also generate and deliver a set of calibration patterns 401–402 to the projector 100. The patterns are described in greater detail below. The calibration patterns are projected onto the display surface 101 and the locations 104. Based on light intensities measured at each location for each pattern, the calibration module 105 determines calibration parameters for a warping function (W) 111 that is relayed to a video-processing module 106. The calibration parameters reflect the internal and external parameters of the projector, also sometimes known as the intrinsic and the extrinsic, and non-linear distortions.

The video processing module 106 distorts the input image 110 generated by a video source 107 such that the output image 102 is undistorted and aligned with the image area 103 when the output image is projected onto the display surface 101. For some applications, it may be useful to pass the calibration parameters and the warping function directly to the video source 107.

The calibration module 105, the video processing module 106, and the video source 107, as well as the projector 100 can be combined into a lesser number of discrete components, e.g., a single processor module with a projector sub-assembly. Other than the optical sensors and image generation hardware, the bulk of the functionality of the system can be implemented with software. However, all the software could also be implemented with hardware circuits.

Figure 2:
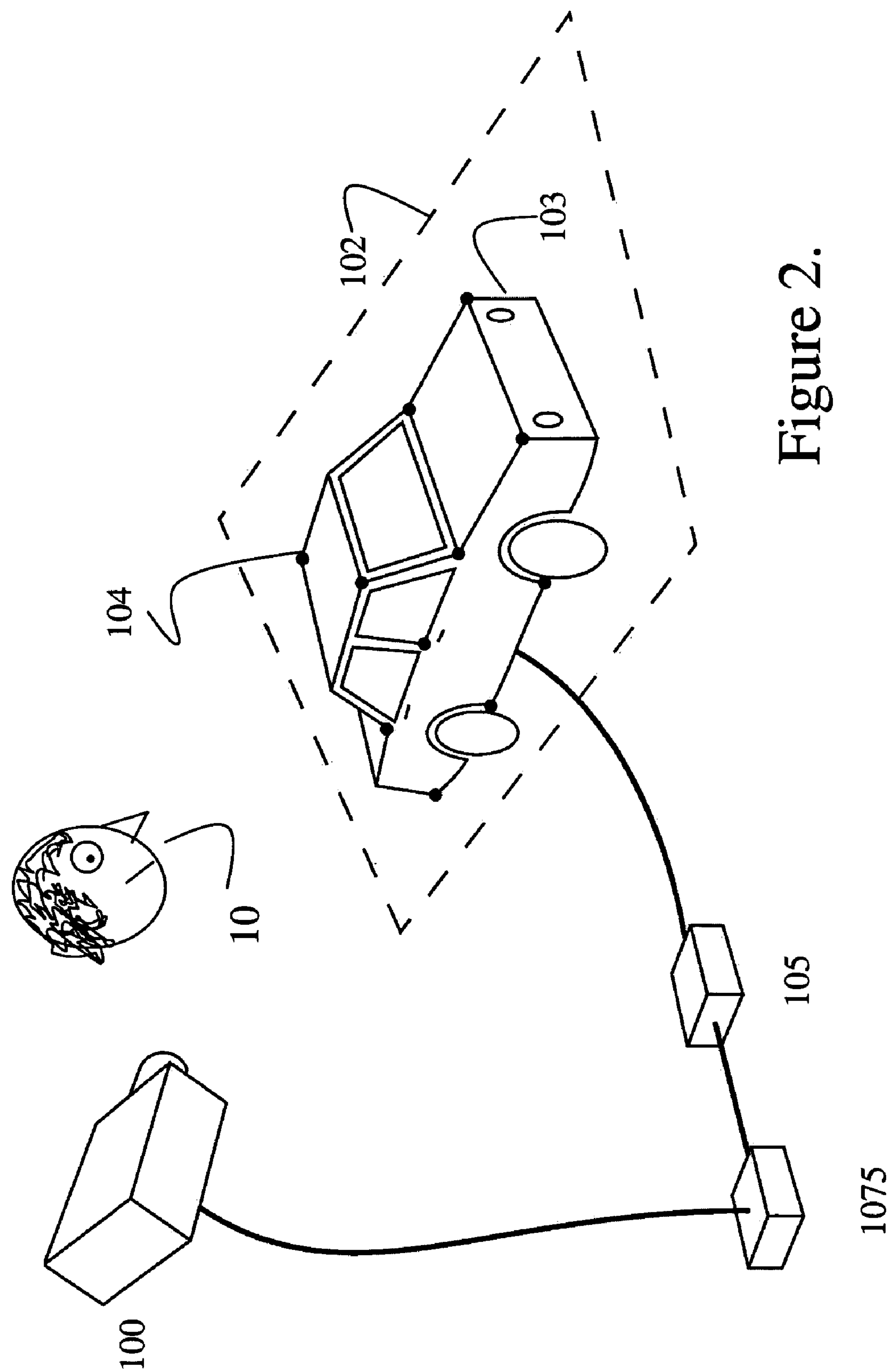
FIG. 2 is a schematic of a system for calibrating a projector to a non-planar display surface.

FIG. 2 shows a complex, non-planar image area 103, for example an exterior surface of a model of an automobile. The model can be full-size, or a scaled version. In the preferred embodiment, the model is a model car made out of plastic or paper, and painted white to render a wide range of colors. The model can be placed in front of a backdrop that forms a 'road surface' and 'scenery'. The backdrop can also be instrumened with sensors. The intent is to have the model appear with various color schemes, without actually repainting the exterior surface. The backdrop can be illuminated so that the car appears to be riding along a road through a scene. Thus, a potential customer can view the model in a simulated environment before making a buying decision. In this case, more than four sensing locations are used. Six is a minimum number of locations required to fit the output image to the display area for an arbitrary projection angle and a non-planar display surface.

The invention enables the projector to be calibrated to planar and non-planar display surfaces 101 containing optically sensed locations 104. The calibration system is capable of compensating for image alignment and distortions to fit the projected output image 102 to the image area 103 on the display surface.

Calibration Method

Figure 3:
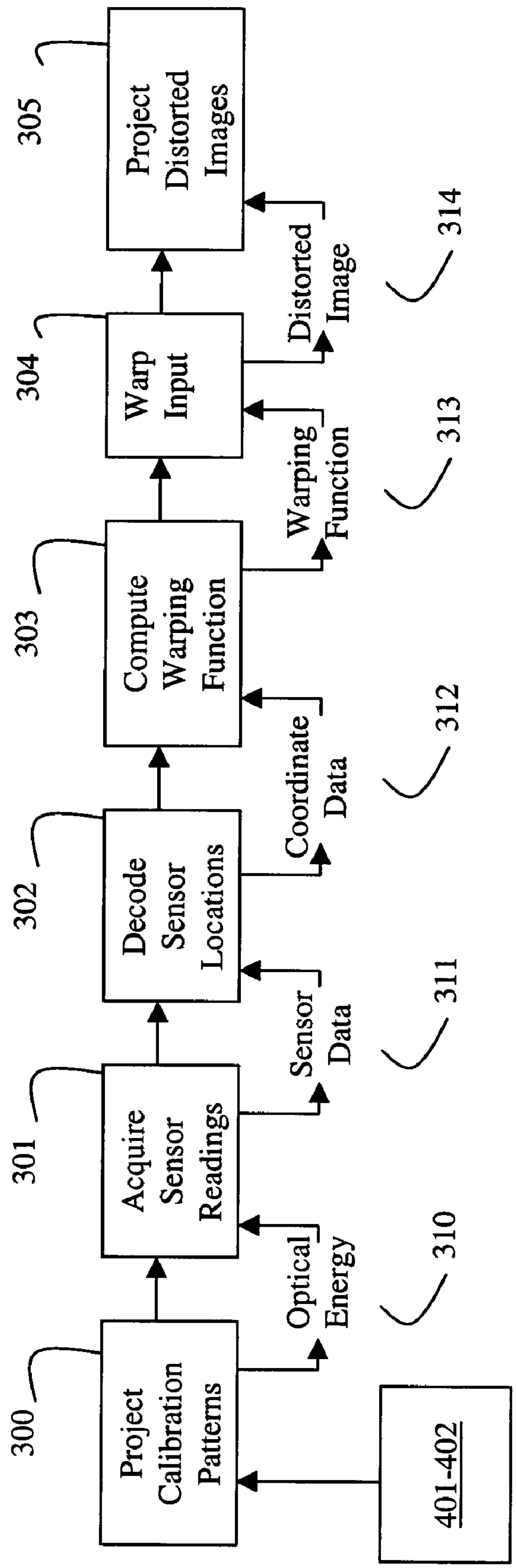
FIG. 3 is a flow diagram of a method for calibrating a projector to a display surface containing optical sensors.

FIG. 3 shows a calibration method according to the invention. The set of calibration patterns 401–402 are projected 300 sequentially. These patterns deliver a unique sequence of optical energies to the sensed locations 104. The sensors acquire 301 sensor data 311. The sensor data are decoded 302 to determine coordinate data 312 of the locations 104. The coordinate data are used to compute 303 a warping function 313. The warping function is used to warp the input image to produce a distorted output image 314, which can then be projected 305 and aligned with the image area 103 on the display surface 101. It should be noted that the distorted image could be generated directly from the location coordinates.

Calibration Patterns

As shown in FIG. 4, the preferred calibration patterns 401–402 are based on a series of binary coding masks described in U.S. Pat. No. 2,632,058 issued to Gray on March 1953. These are now known as Gray codes. Gray codes are frequently used in mechanical position encoders. As an advantage, Gray codes can detect a slight change in location, which only affects one bit. Using a conventional binary code, up to n bits could change, and slight misalignments between sensor elements could cause wildly incorrect readings. Gray codes do not have this problem. The first five levels 400, labeled A, B, C, D, E, show the relationship between each subsequent pattern with the previous one as the vertical space is divided more finely. The five levels in 400 are related with each of the five pairs of images (labeled A, B, C, D, E) on the right. Each pair of images shows how a coding scheme can be used to divide the horizontal axis 401 and vertical axis 402 of the image plane. This subdivision process continues until the size of each bin is less than a resolution of a projector pixel. It should be noted that other patterns can also be used, for example the pattern can be in the form of a Gray sinusoid.

When projected in a predetermined sequence, the calibration patterns deliver a unique pattern of optical energy to each location 104. The patterns distinguish inter-pixel positioning of the locations 104, while requiring only $\lceil \log_2(n) \rceil$ patterns, where n is the number of pixels in the projected image.

The raw intensity values are converted to a sequence of binary digits 311 corresponding to presence or absence of light [0,1] at each location for the set of patterns. The bit sequence is then decoded appropriately into horizontal and vertical coordinates of pixels in the output image corresponding to the coordinates of each location.

The number of calibration patterns is independent of the number of locations and their coordinates. The display surface can include an arbitrarily number of sensed locations, particularly if the surface is an arbitrary complex manifold. Because the sensed locations are fixed to the surface, the computations are greatly simplified. In fact, the entire calibration can be performed in a fraction of a second.

The simplicity and speed of the calibration enables dynamic calibration. In other words, the calibration can be performed dynamically while images or videos are projected on the display surface, while the display surface is changing shape or location. In fact the shape of the surface can be dynamically adapted to the sensed data 311. It should also be noted, that the calibration patterns can be made invisible by using infrared sensors, or high-speed, momentary latent images. Thus, the calibration patterns do not interfere with the display of an underlying display program.

Alternatively, the calibration pattern can be pairs of images, one followed immediately by its complementary negation or inverse, as in steganography, making the pattern effectively invisible. This also has the advantage that the light intensity measurement can be differential to lessen the contribution of ambient background light.

Warping Function

For four co-planar locations, the calibration module 105 determines a warping function:

$$p_s = W^* p_o$$

where w is a warp matrix, $p_s$ are coordinates of the sensed locations, and $p_o$ are coordinates of corresponding pixels in the output image that are to be aligned with each display surface location.

Using the sensed values of $p_s$ and known values for $p_o$, the correspondences of the warp matrix w can be resolved. This is known as a homography, a conventional technique for warping one arbitrary quadrilateral area to another arbitrary quadrilateral. Formally, a homography is a three-by-three, eight-degree-of-freedom projective transformation H that maps an image of a 3D plane in one coordinate frame into its image in a second coordinate frame. It is well known how to compute homographies, see Sukthankar et al., "Scalable Alignment of Large-Format Multi-Projector Displays Using Camera Homography Trees," Proceedings of Visualization, 2002.

Typically, the pixels $p_o$ are located at corners of the output image. If more than four locations are used, a planar best-fit process can be used. Using more than four locations improves the quality of the calibration. Essentially, the invention uses the intensity measurement to correlate the locations to corresponding pixels in the output images.

The warp matrix w is passed to the video-processing module 106. The warping function distorts the input images correcting for position, scale, rotation, and keystone distortion such that the resulting output image appears undistorted and aligned to the image area.

Non-Planar Surfaces

Arbitrary manifolds can contain locations with surface normals at an obtuse angle to the optical axis of the projector. Sensors corresponding to these locations may not receive direct lighting from the projector making them invisible during the calibration process. Therefore, sensed locations should be selected so that they can be illuminated directly by the projector.

A generalized technique for projecting images onto arbitrary manifolds, as shown in FIG. 3, is described by Raskar et al., in "System and Method for Animating Real Objects with Projected images," U.S. patent application Ser. No. 09/930,322, filed Aug. 15, 2001, incorporated herein by reference. That technique requires knowing the geometry of the display surface and using a minimum of six calibration points. The projected images can be used to enhance, augment, or disguise display surface features depending on the application. Instead of distorting the output image, the calibration data can also be used to mechanically move the projector to a new location to correct the distortion. In addition, it is also possible to move or deform the display surface itself to correct any distortion. It is also possible to have various combinations of the above, e.g., warp the output and move the projector, or warp the output and move the display surface. All this can be done dynamically, while keeping the system calibrated.

Although the main purpose of the method is to determine projector parameters that can be to distort or warp an input image, so the warped output image appears undistorted on the display surface. However, the calibration parameters can also be used for other purposes such as finding a pose of the projector with respect to the display surface, which involves internal and external geometric parameters. The pose can be used for other applications, e.g., lighting calculations in an image-enhanced environment, or for inserting synthetic objects into a scene.

The parameters can also be used for finding a distance between the projector and the display surface, finding angles of incident projector rays on surface with known geometry, e.g., for performing lighting calculations in 3D rendering program or changing input intensity so that the image intensity on display surface appears uniform, classifying surface regions into segments that are illuminated and are not illuminated by the projector, determining radial distortion in the projector, and finding deformation of the display surface.

The invention can also be used to calibrate multiple projectors concurrently. Here, multiple projectors project overlapping images on the display surface. This is useful when the display surface is very large, for example, a planetarium, or the display surface is viewed from many sides.

Although the invention has been described by way of examples of preferred embodiments,.it is to be understood that various other adaptations and modifications may be made within the spirit and scope of the invention. Therefore, it is the object of the appended claims to cover all such variations and modifications as come within the true spirit and scope of the invention.

We claim:

1. A method for determining correspondence between locations on a display surface having an arbitrary shape and pixels in an output image of a projector, comprising:

projecting a set of known calibration patterns onto the display surface; sensing directly an intensity of light at each of a plurality of locations on the display surface for each calibration pattern, there being one discrete optical sensor associated with each location, and in which the optical sensor is coupled to the corresponding location by an optical fiber; and correlating the intensities at the locations to determine correspondences between the plurality of locations and pixels in an output image of the projector.

2. The method of claim 1, in which each location has known coordinates.

3. The method of claim 1, in which the calibration patterns are in a form of Gray codes.

4. The method of claim 1, in which the correspondences are used to determine parameters of the projector.

5. The method of claim 4, in which the parameters include internal and external parameters and non-linear distortions of the projector.

6. The method of claim 1, further comprising:

warping an input image to the projector according to the correspondences; and projecting the warped input image on the display surface to appear undistorted.

7. The method of claim 1, in which the projector is casually aligned with the planar display surface.

8. The method of claim 1, in which the display surface is planar.

9. The method of claim 1, in which the display surface is quadric.

10. The method of claim 1, in which a viewer and the projector are on a same side of the display surface.

11. The method of claim 8, in which the display surface is planar and a number of locations is four.

12. The method of claim 1, in which the optical sensor is a photo transistor.

13. The method of claim 1, in which the intensity is quantized to zero or one.

14. The method of claim 1, further comprising:

warping a sequence of input images to the projector according to the correspondences; and projecting the warped sequence of input image on the display surface to appear undistorted as a video.

15. The method of clam 14, in which the display surface and the projector are moving with respect to each other while determining the correspondences, warping the sequence of images, and projecting the warped sequence of input images.

16. The method of claim 1, in which the display surface is an external surface of a 3D model of a real-world object.

17. The method of claim 1, in which the display surface includes a backdrop on which the 3D model is placed.

18. The method of claim 1, in which the light is infrared.

19. The method of claim 1, in which each calibration image is projected as a pair, a second image of the pair being an inverse of the calibration image.

20. The method of claim 1, in which the correspondences are used to relocate the projector.

21. The method of claim 1, in which the correspondences are used to deform the display surface.

22. A system for determining correspondence between locations on a display surface having an arbitrary shape and pixels in an output image of a projector, comprising:

a display surface having a plurality of locations with known coordinates;

a plurality of known calibration patterns;

means for sensing directly an intensity of light at each of the plurality of locations on the display surface for each calibration pattern, and in which each location is optically coupled to a discrete photo sensor by an optical fiber; and means for correlating the intensifies at the locations to determine correspondences between the plurality of locations and pixels in an output image of the projector.

23. The system of claim 22, in which the optical fiber is located in a throughhole in the display surface.

24. A method for determining correspondence between locations on a display surface having an arbitrary shape and pixels in an output image of a projector, comprising:

sensing directly an intensity of light at each of a plurality of locations on a display surface for each of a plurality of calibration patterns projected on the display surface, there being one discrete optical sensor associated with each location, and in which each location is optically coupled to a discrete photo sensor by an optical fiber; and correlating the intensifies at the locations to determine correspondences between the plurality of locations and pixels in an output image of the projector.

* * * * *